US007823179B2

United States Patent
Liu et al.

(10) Patent No.: US 7,823,179 B2
(45) Date of Patent: Oct. 26, 2010

(54) SYSTEM AND METHOD FOR EDGE RESOURCE MANAGEMENT

(75) Inventors: Xiaomei Liu, San Jose, CA (US); Ashok Bhaskar, Bangalore (IN); Sangeeta Ramakrishnan, San Jose, CA (US); Bruce Thompson, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 1584 days.

(21) Appl. No.: 11/109,200

(22) Filed: Apr. 18, 2005

(65) Prior Publication Data

US 2006/0236358 A1    Oct. 19, 2006

(51) Int. Cl.
*H04N 7/173* (2006.01)
(52) U.S. Cl. .............................. 725/97; 725/95; 725/96; 725/98; 725/117; 725/118
(58) Field of Classification Search ............ 725/87–104
See application file for complete search history.

(56) References Cited

U.S. PATENT DOCUMENTS

| 6,909,726 | B1 | 6/2005 | Sheeran |
| 6,986,156 | B1 | 1/2006 | Rodriguez et al. |
| 2005/0289618 | A1 * | 12/2005 | Hardin ........................ 725/95 |

OTHER PUBLICATIONS

Delivery.acm.org, Wei Zhao, Satish K. Tripathi; "Bandwidth-Efficient Continuous Media Streaming Through Optimal Multiplexing," 10 pages total, 1999, delivery.acm.org/10/1145/310000/301476/p13-zhao.pdf?key1=301476&key2=2231343511&coll=ACM&dl=ACM&CFID=15151515&CFTOKEN=6184618.

* cited by examiner

*Primary Examiner*—John W Miller
*Assistant Examiner*—Omar Parra
(74) *Attorney, Agent, or Firm*—Stolowitz Ford Cowger LLP (57) ABSTRACT

The present invention relates generally to a system for managing bandwidth usage in a content delivery system such as a Video on Demand (VOD) network. Specifically, an Edge Resource Manager (ERM) makes use of a number of policies to optimally select a transmission device such as a Quadrature Amplitude Modulation (QAM) device. The policies aid in providing efficient use of the transmission devices particularly when a number of different transmission rates for different media are employed.

20 Claims, 4 Drawing Sheets

SYSTEM AND METHOD FOR EDGE RESOURCE MANAGEMENT

FIELD OF THE INVENTION

The present invention relates generally to a system and method for managing the use of edge resources such as Radio Frequency (RF) bandwidth resources within a content delivery system such as Video on Demand (VOD).

BACKGROUND OF THE INVENTION

In a complex cable network, Multiple Service Operators (MSOs) deploy multiple services over what was traditionally a cable network to carry television content. Now these traditional cable networks are utilized to carry other content. For example, cable networks commonly carry Internet Protocol (IP) communications and Video on Demand (VOD) content. VOD delivers video such as a movie, over the network to a user, typically via a set top box connected to the television of the user. As VOD consumes large amounts of resources it is important for an MSO to efficiently utilize their resources to provide the optimum handling of VOD transmissions. The present invention addresses this need by providing a system and method for efficient bandwidth allocation in a content delivery system providing content such as VOD.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE INVENTION

Figure 1:
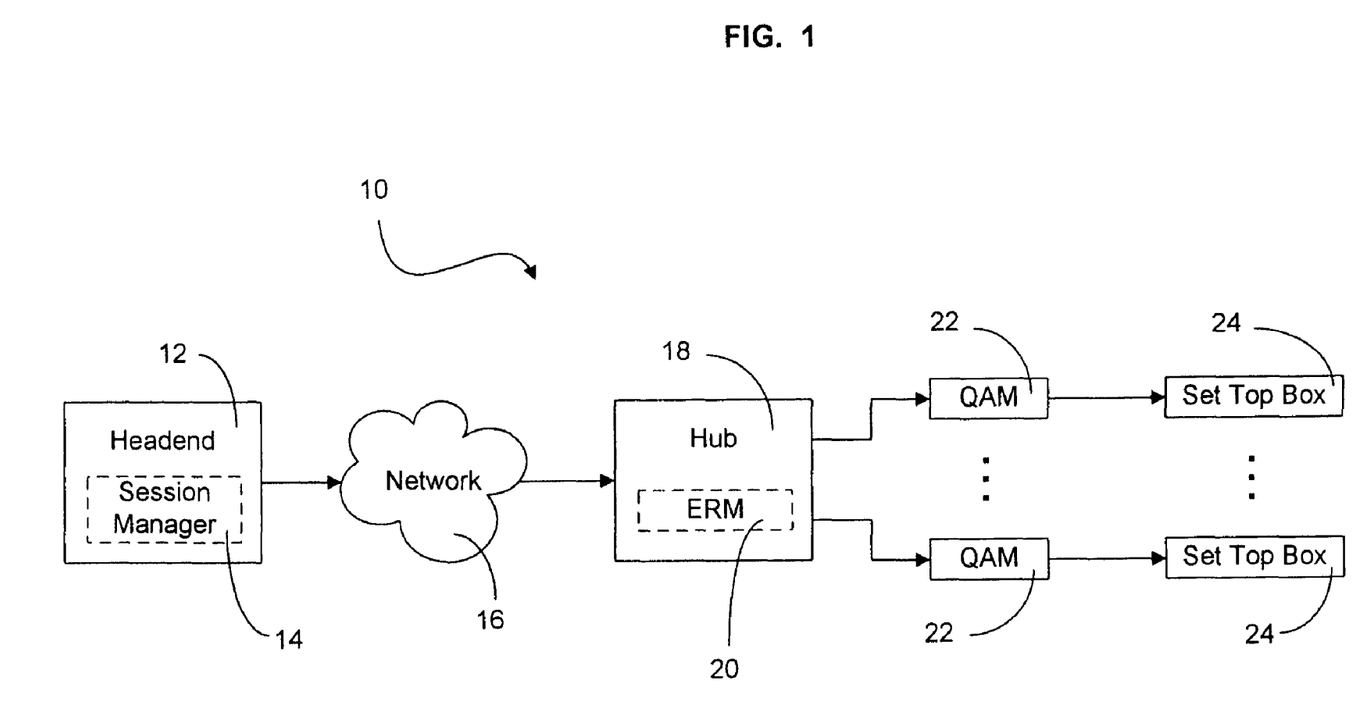
FIG. 1 is a block diagram of a content delivery system.

Referring first to FIG. 1 a block diagram of a content delivery system is shown generally as 10. It is not the intent of the inventors to restrict the present invention to VOD. VOD is simply one example of the type of application that may be handled by the present invention. The present invention may be utilized for any application that provides content requiring bandwidth guarantees. Examples of such applications would be Network Personal Video Recorder (NPVR), switched broadcast, on demand distribution of television programming, or Voice over IP (VoIP). Any system making use of real time content delivery that requires management of resources may make use of the present invention.

In system 10, headend 12 controls the content that may be distributed via system 10. For example headend 12 may comprise a number of components that control video servers containing movies that may be sent to a user for viewing on their television set or other device capable of receiving streaming video. Network 16 connects headend 12 to hub 18. Network 16 may be any form of network capable of efficiently carrying the desired content. Typically network 16 would be an internal system managed by a MSO or the Internet. Hub 18 controls the distribution of content received from headend 12 to the correct user. To distribute content, hub 18 makes use of a plurality of Quadrature Amplitude Modulation (QAM) devices 22. Each QAM 22 is connected to a plurality of set top boxes 24. FIG. 1 shows each QAM 22 being connected to a single set top box 24 for simplicity only; a QAM 22 may be connected to a plurality of set top boxes 24. A set top box 24 is a computing device that accepts the content from a QAM 22 and displays it on the television of the user. However, it is not the intent of the inventor to restrict the term "set top box" to a box that works with a television, it could equally be any device that accepts the content from a QAM 22, such as a Digital Video Recorder, a desktop computer or laptop computer.

For system 10 to function properly, the present invention utilizes two main components. The first is a session manger 14, residing within headend 12. Session manager 14 accepts a user request for content to be sent to a set top box 24. Session manager 14 determines the resources required to satisfy the user request. To do so, session manager 14 contacts a number of different resource managers to allocate the needed resources to satisfy the user request. One of the resource managers is an Edge Resource Manager (ERM) 20, which in one embodiment is located within hub 18. ERM 20 handles the utilization of bandwidth, and this is where the present invention resides. As one skilled in the art can appreciate ERM 20 and any of the components that make up ERM 20 may reside anywhere within system 10, upstream of QAMs 22.

Figure 2:
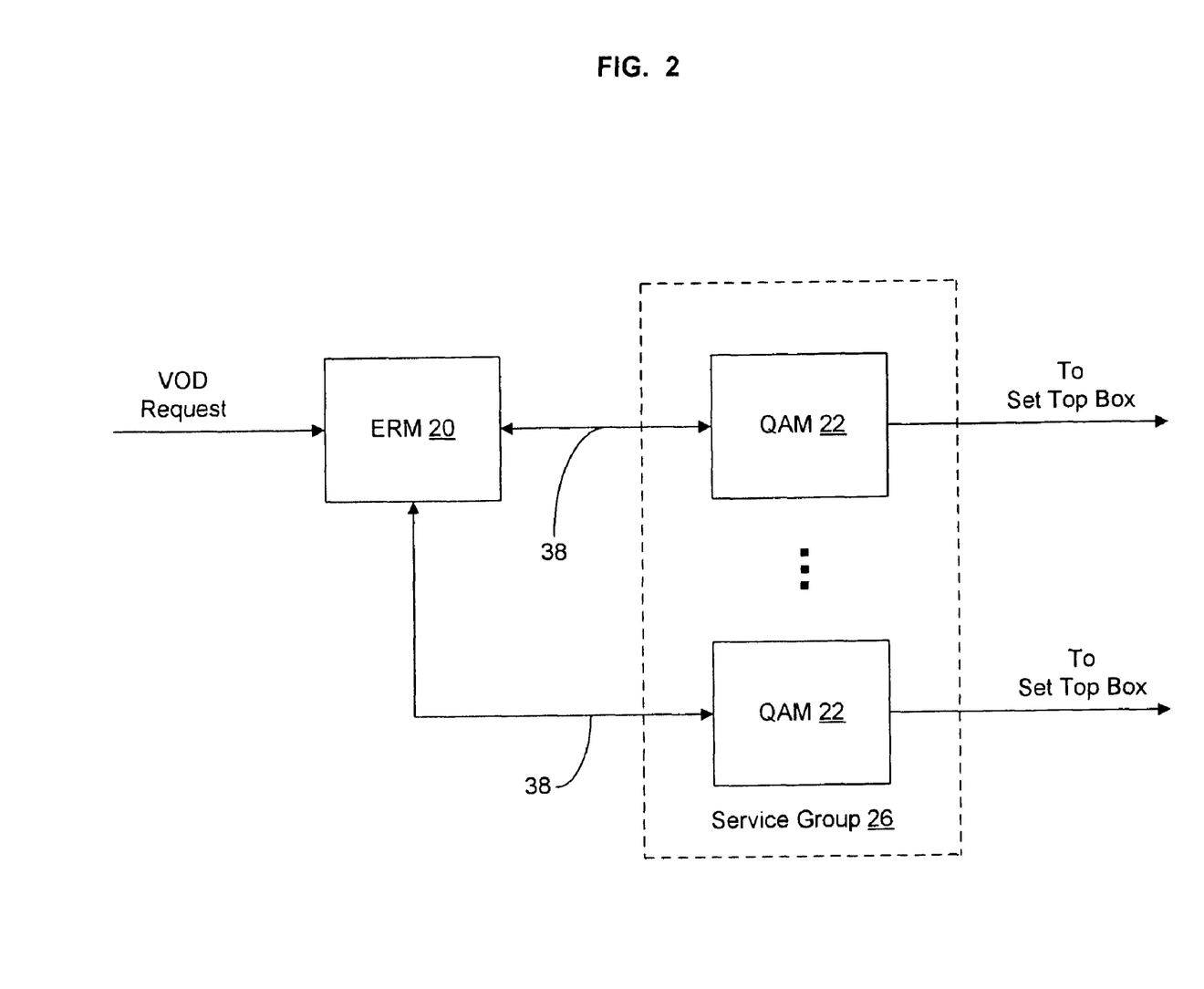
FIG. 2 is a block diagram illustrating the function of an ERM.

FIG. 2 is a block diagram illustrating the function of an ERM 20. ERM 20 accepts a content request from session manager 14. Based upon the content to be sent and the user address, ERM 20 efficiently selects a QAM 22 from a service group 26 of QAMs 22 capable of serving the targeted user. ERM 20 obtains status on each QAM 22 in service group 26 via a connection 38 established with each QAM 22 in the service group 26. Once ERM 20 has selected a QAM 22, session manager 14 is informed of the selected QAM and the content is delivered to the set top box 24 of the targeted user, via the selected QAM 22.

Users are grouped together into service groups 26 and each service group 26 collectively provides a bandwidth pool. Each transmission device, for example a QAM, has a fixed amount of bandwidth available at a specific time. A bandwidth pool is the total of the bandwidth available from each transmission device.

A QAM 22 mixes multiple input streams from network 16 into a single output stream. This single output stream is sent to a set top box 24 where the content requested by a user is decoded from the multiple streams. Each QAM 22 has a limit on the bandwidth it can handle and if not efficiently utilized some QAMs 22 may be overloaded while others are under utilized. In the present invention, ERM 20 efficiently assigns content to a set of QAMs 22 that serve a specific service group 26.

ERM 20 keeps track of RF bandwidth utilization within a service group 26 and from this can determine if a new request to transmit content can be accepted or rejected. It is desirable for ERM 20 to have an efficient bandwidth allocation algorithm so that a maximum number of streams can be provided.

What follows are some policies that may be considered by ERM 20.

1) High Availability Load Balancing

For high availability, ERM 20 must balance the load among all QAMs 22 in a service group. Thus, should a QAM 22 fail, only a limited number of sessions are affected.

2) Mixed Rate Efficiency

By way of example, under normal VOD operation, a user request could be for standard definition (SD) video, high definition (HD) video or digital music audio (AUD). The bandwidth requirement for each of these different types of content is quite varied, dependent upon the quality required and the encoding and decoding scheme used. The following serve only as an example of typical bandwidth requirements. For typical Moving Pictures Expert Group (MPEG) MPEG-2 SD video, the bandwidth is on the order of 4 Mbps per session. For typical MPEG-2 HD video, the bandwidth could be 15 Mbps per session. For AUD, the bandwidth is typically on the order of 256 kbps. If bandwidth were to be allocated evenly among QAMs 22, it is possible that a HD request may be rejected because no QAM 22 has enough bandwidth for the HD request. However, it may be possible that the combined available bandwidth in a service group 26 could accommodate the HD request. Therefore it is desirable that ERM 20 allocates bandwidth to minimize rejection for HD requests.

3) Conditional Access (CAS)

Conditional access systems protect content by encryption. Conditional access systems control user access to content, ensure the user is billed for the access, and protects content from unauthorized viewing. In some systems, not all QAMs 22 will have CAS capability or even the same CAS capability. Those that have a CAS capability need to be available for subscribers that make use of content under CAS control. Further, STBs 24 may have different CAS capabilities. In general, ERM 20 should avoid rejecting a non-CAS session if a non-CAS QAM is booked while a CAS QAM is available.

4) Sharing QAMs

In some content delivery systems, QAMs 22 may be shared among multiple service groups 26. For example, there may be QAMs 22 solely for specific types of content, as it may be desirable to send specific types of content using shared QAMs 22 to achieve additional bandwidth savings.

5) Business Policies

In addition to the four policies discussed above, there may be other considerations in determining bandwidth allocation. For example, the MSO may want to add business rules into the allocation of bandwidth. If HD is more important to the business, a fixed amount of bandwidth may be allocated solely for HD use at the expense of SD. As another example, the MSO may provide different levels of service, such as gold, silver and bronze. When bandwidth utilization is high, perhaps only gold customers may be serviced. In another example, an MSO may prioritize revenue generating streams over free content. In this last example, a certain amount of bandwidth could be reserved for paying customers to ensure free content does not take up all bandwidth.

The present implementation of ERM 20 utilizes a generic scheme to take into consideration a number of policies. As can be seen from the discussion above, sometimes policies may contradict each other. For example, in the case of high availability the bandwidth should be distributed evenly, however for mixed rates, even distribution may not be desirable. To resolve these inconsistencies, the following factors have been adopted in the present implementation of the selection process by ERM 20 for a QAM 22:

a) each policy is independent;

b) each policy can have a different priority (weight);

c) a QAM 22 is evaluated based on each policy supported and gets a score for each policy;

d) the total score of a QAM 22 determines which QAM 22 is selected, i.e. the highest score wins; and e) only a QAM 22 that meets the basic bandwidth requirement is considered as a candidate.

Utilizing these factors we now refer back to the policies discussed above and provide examples of how they may be calculated in selecting a QAM 22.

1) High Availability Load Balancing $$HA\_Score = HA\_Weight * Available\_BW / Total\_BW$$

| Term | Definition |
| --- | --- |
| HA_Score | The high availability score for a QAM |
| HA_Weight | The weight assigned to the importance of the high availability policy |
| Available_BW | Amount of bandwidth currently available for the QAM |
| Total_BW | The total bandwidth the QAM is capable of handling |

2) Mixed Rate Efficiency

In considering HD transmissions:

```
if (INT((Available_BW - Requested_BW)/HD_BW) ==
   INT(Available_BW/HD_BW)) then
       HD_Score = HD_Weight
Else
       HD_Score = 0
```

| Term | Definition |
| --- | --- |
| HD_Score | The score for a High Definition transmission request |
| INT | A function that returns an integer value |
| Available_BW | Amount of bandwidth currently available for the QAM |
| Requested_BW | Amount of bandwidth requested |
| HD_BW | The average bandwidth required for a HD transmission, for example 15 Mbps. |
| HD_Weight | The weight assigned to the importance of HD in this policy. |

This simple policy tries best to preserve HD bandwidth within a QAM 22, but not at the expense of SD transmissions. This policy can also be extended to consider when allocation of an audio stream may affect the allocation of a SD stream. By way of example, consider two QAMs in a service group 26. QAM1 has 4 Mbps available. QAM2 has 3 Mbps available. A new request for an audio stream requires a bandwidth of 256 kbps. The policy would select QAM2 so that the next SD stream of 4 Mbps will not be blocked. For a second example, consider two QAMs in a service group 26. QAM1 has 15 Mpbs available and QAM2 has 1 Mbps available. Should a request for 1 Mbps arrive, the above policy for HD transmissions would ensure that the request is handled by QAM2, thus allowing QAM1 to handle a typical HD transmission of 15 Mbps. QAM11 would have a HD_Score of zero, while QAM2 would have an HD_Score of HD_Weight.

In considering SD transmissions:

```
if (INT((Available_BW - Requested_BW)/SD_BW) ==
   INT(Available_BW/SD_BW)) then
       SD_Score = SD_Weight
else
       SD_Score = 0
```

| Term | Definition |
| --- | --- |
| SD_Score | The score for a Standard Definition transmission request |
| INT | A function that returns an integer value |
| Available_BW | Amount of bandwidth currently available for the QAM |
| Requested_BW | Amount of bandwidth requested |
| SD_BW | The average bandwidth required for a SD transmission, for example 4 Mbps. |
| SD_Weight | The weight assigned to the importance of SD in this policy. |

The invention may also consider a HD to SD value ratio. The value ratio is the ratio of HD to SD price. The HD and SD price are what the MSO charges the user for a HD stream or a SD stream respectively. Based on this ratio the value of HD_Weight may be adjusted as follows:

$$HD\_Weight = HD\_Weight\_max * HD\_SD\_value\_ratio / HD\_SD\_bandwidth\_ratio$$

| Term | Definition |
| --- | --- |
| HD_Weight | The weight assigned to the importance of HD in this policy |
| HD_Weight_max | The maximum acceptable value for HD_Weight |
| HD_SD_value_ratio | The price to a user of a HD stream divided by the price to a user of a SD stream. |
| HD_SD_bandwidth_ratio | The average bandwidth for a HD transmission divided by the average bandwidth of a SD transmission. |

3) Conditional Access (CAS)

In the case of providing a CAS policy, the following may be used:

```
if (QAM_CAS_type == CAS_type) then
    CAS_Score = CAS_Weight
else
    CAS_Score = 0
```

| Term | Definition |
| --- | --- |
| QAM_CAS_type | The type of CAS requests that a QAM may service |
| CAS_type | The type of CAS request |
| CAS_Score | The CAS score for a QAM |
| CAS_Weight | The weight applied to the use of a CAS policy |

4) Sharing QAMs

```
if (QAM_sharing_type == stream_sharing_type) then
    Sharing_Score = Sharing_Weight
else
    Sharing_Score = 0
```

| Term | Definition |
| --- | --- |
| QAM_sharing_type | A flag indicating if the QAM is shared by multiple service groups. |
| stream_sharing_type | A value indicating the type of content that the QAM may deliver. |
| Sharing_Score | The Sharing score for a QAM |
| Sharing_Weight | The weight applied to the use of a sharing policy |

5) QAM Selection

For the final selection of a QAM, the following may be used:

QAM_score = sum of all policy scores for the QAM

The QAM with the highest value of QAM_score in the service group 26 is then selected to handle the transmission.

Figure 3:
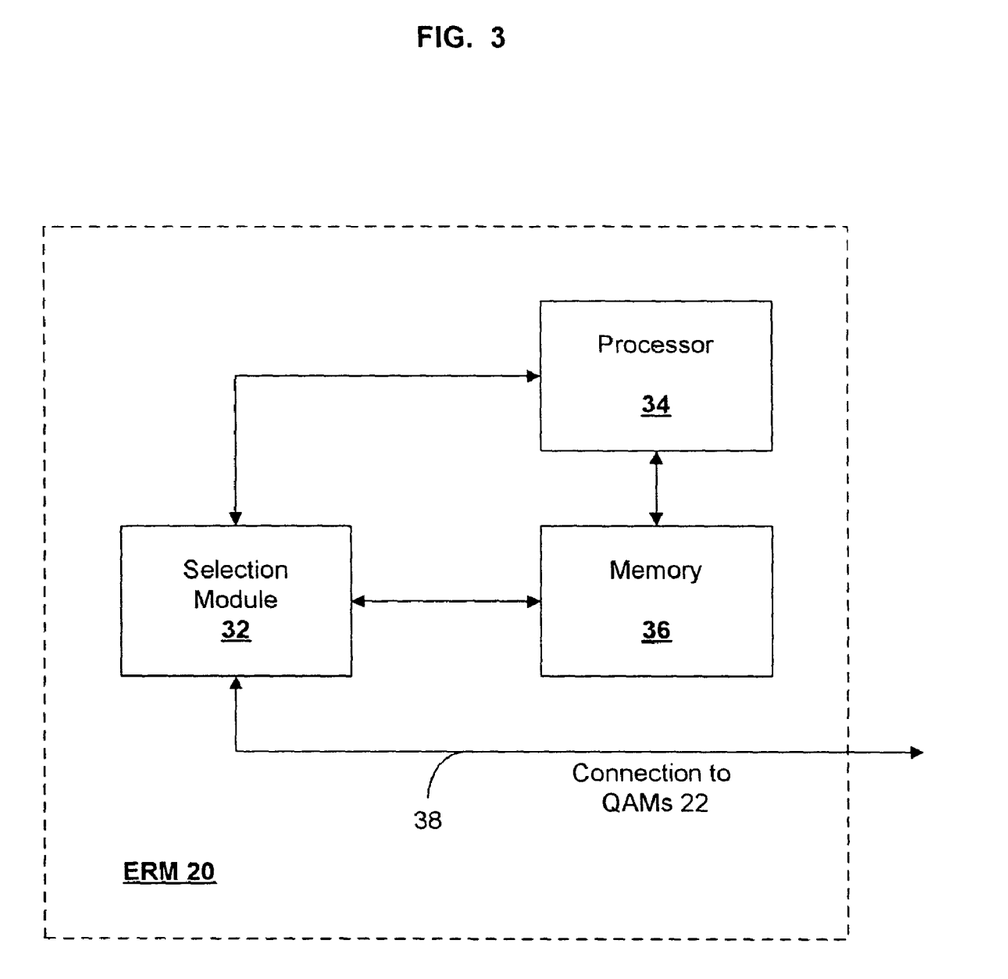
FIG. 3 is a block diagram of the components of an ERM.

Referring now to FIG. 3, a block diagram of the components of an ERM is shown. In one embodiment ERM 20 comprises a selection module 32, a processor 34, memory 36 and a connection to QAMs 38. Selection module 32 comprises the logic required to implement the policies in place to select a transmission device such as a QAM 22. Processor 34 is a computing device capable of executing the logic of selection module 32. Memory 36 is utilized by either or both of selection module 32 and processor 34 to store and retrieve data. Memory 36 would typically comprise a form of Random Access Memory (RAM) providing rapid access to the storage and retrieval of data. Although memory 36 is shown as a separate module, each of selection module 32 and processor 34 may have their own distinct or shared memory 36. A single memory 36 serves only as an example of one implementation. Connection 38 serves to permit selection module 32 to access status information from each QAM 22 in a service group 26 to aid in selecting a QAM 22 to handle the transmission.

As one skilled in the art can appreciate ERM 20 and any of processor 34 and memory 36 may reside anywhere within system 10, upstream of QAMs 22. For maximum performance, ERM 20 would typically reside with processor 34 and memory 36 in a computing device upstream of QAMs 20. Examples of such computing devices would include a router or a switch.

Figure 4:
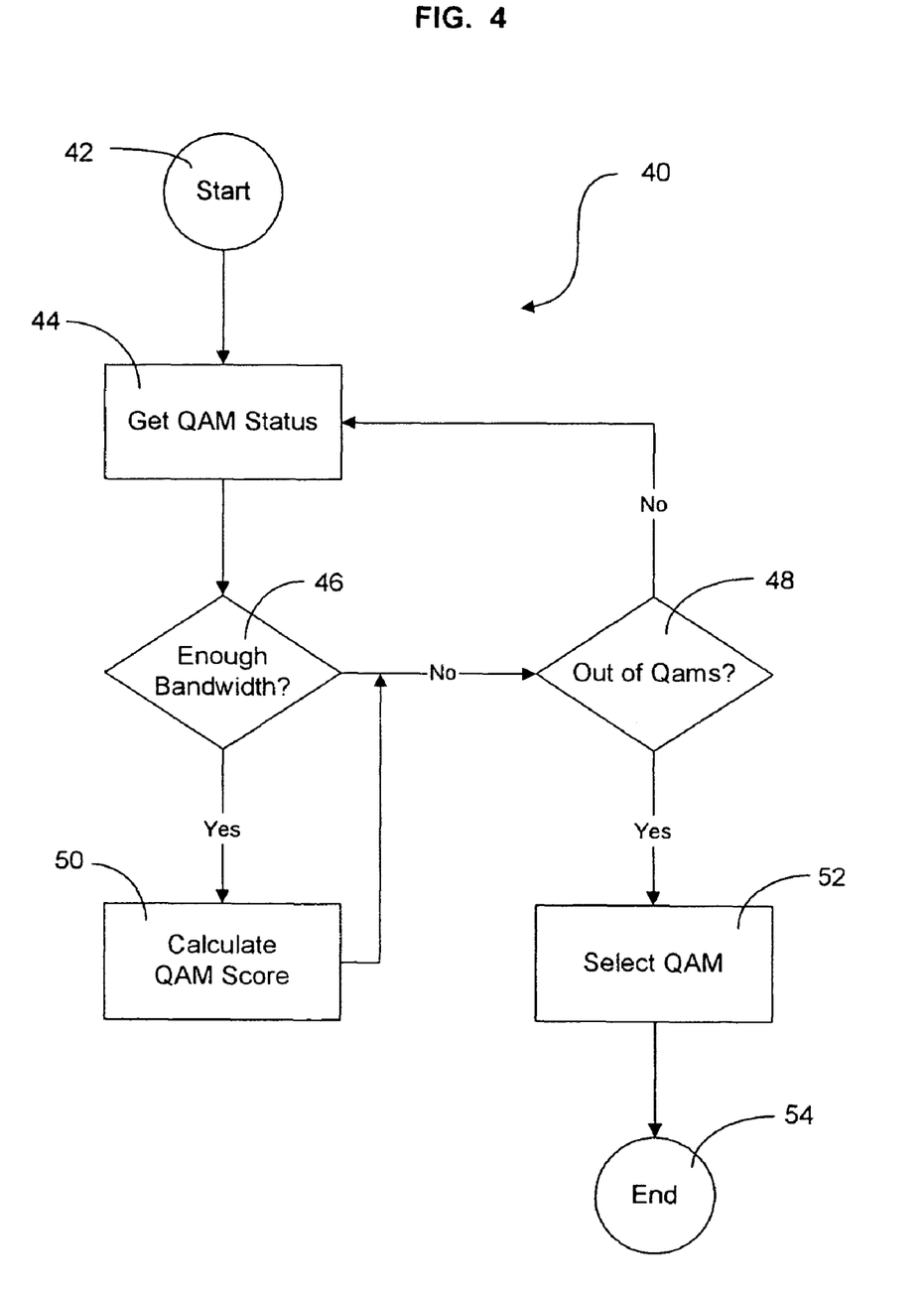
FIG. 4 is a flowchart of a QAM selection process.

Referring now to FIG. 4 a flowchart of the QAM selection process is shown generally as 40. Beginning at step 42 ERM 20 has been requested to select a QAM 22. Moving to step 44 a QAM 22 from the appropriate service group 26 is selected and its current status determined. Processing them moves to step 46 where a test is made to determine if current QAM 22 has sufficient bandwidth to handle the transmission. If not, processing moves to step 48 where a test is made to determine if there are anymore QAMs 22 to examine in the service group 26. If there are QAMs remaining, processing returns to step 44 otherwise to step 52. If at step 46 it is determined that the current QAM 22 has sufficient bandwidth to handle the transmission, processing moves to step 50 where a QAM_score is calculated for the current QAM 22. In one embodiment, a QAM_score is determined by calculating a score for each policy in effect and summing the scores. Although the example provided makes use of a weighted summation of policy scores to obtain a QAM_score, it is not the intent of the inventors to restrict the present invention to a specific means of calculating a QAM_score. Any method of applying both weights with a policy score in determining a QAM_score are intended to be within the scope of this invention. A function f, where $p_i$ to $p_n$ are policy scores and $w_i$ to $w_n$ are weights for each policy, may be utilized. In general:

$$QAM\_score = f(p_i, w_i \ldots p_n, w_n)$$

From step 50 processing returns to step 48. If at step 48 it is found either from step 46 or step 50 that there are no more QAMs 22 to examine in the service group 26, processing moves to step 52. At step 52 the QAM_score values for each QAM 22 in the service group 26 are compared. QAM 22 with the highest QAM_score is then selected to handle the transmission and processing ends at step 54.

The use by an ERM 20 of the above described method is flexible and efficient. It is extensible to any number of polices. For example should more parameters be available to an ERM 20, such as duration of a request, an additional policy could be provided to account for this information. Further, the use of an adjustable weight in a policy allows for different MSOs to apply different priorities. The inventors have provided example policies but do not intend to restrict the invention to a specific set of policies nor to a specific calculation for a policy.

In simulation the use of the mixed rate efficiency policy yielded as much as a 40% savings by comparing a cost adjusted blocking factor to the standard round-robin selection of QAMs 22. A blocking factor indicates the amount of user requests that have been rejected. A cost adjusted blocking factor incorporates the differing costs an MSO may charge a user for delivering content. HD content will typically provide greater revenue to an MSO than SD content. Thus, blocking a HD request will cost an MSO more than blocking a SD request. With HD taking up a significant amount of VOD bandwidth, this has the potential for significant cost savings for an MSO that pays a fixed rate for their bandwidth, whether they use it or not.

Although the present invention has been described for optimizing bandwidth access through the use of transmission devices such as QAMs in a service group, it is not the intent of the inventors to restrict the present invent to the use of QAMs. Any number of transmission devices such as muiltiplexers may be utilized in the present invention. It is also not the intent of the inventors to restrict the present invention to the management of RF bandwidth, for example the present invention may be used to optimize the selection of transmission devices that utilize the Internet Protocol (IP).

In general, the present invention is applicable whenever multiple links or paths are available over which a stream of data can be transported to a user and decisions need to be made as to which path to choose for the stream. This approach is particularly useful when a stream cannot be switched from one path to another during delivery, and when all data within the stream are required to use a single path.

Although the invention has been described with reference to certain specific embodiments, various modifications thereof will be apparent to those skilled in the art without departing from the spirit and scope of the invention as outlined in the claims appended hereto.

We claim:

1. A system, comprising:
    a hub operatively connected to a plurality of transmission devices that deliver content to one or more end users; and
    a processor configured to:
        determine a requested bandwidth associated with a content request received from a headend, wherein the content request is transmitted by the headend in response to a request for the content from the one or more end users;
        identify an available bandwidth associated with each of the plurality of transmission devices;
        calculate an available bandwidth score for each of the plurality of transmission devices, wherein the available bandwidth score comprises a ratio of the requested bandwidth and the available bandwidth;
        determine a service type associated with the content request;
        identify an available service associated with each of the plurality of transmission devices;
        calculate a service type score for each of the plurality of transmission devices, wherein the service type score comprises a comparison of the service type and the available service;
        determine a total score based, at least in part, on a summation of the available bandwidth score and the service type score, for each of the plurality of transmission devices; and
        select a transmission device having a highest total score from the plurality of transmission devices to handle a transmission of the content to the one or more end users.

2. The system of claim 1, wherein the service type indicates whether or not the content is encrypted, and wherein the available service indicates that a transmission device is capable of transmitting encrypted content.

3. The system of claim 1, wherein the content comprises video on demand.

4. The system of claim 1, wherein the plurality of transmission devices comprise Quadrature Amplitude Modulation devices.

5. An apparatus, comprising:
    means for determining a requested bandwidth associated with a content request;
    means for identifying an available bandwidth associated with each transmission device of a set of transmission devices configured to deliver the content;
    means for calculating an available bandwidth score for each transmission device based on a comparison of the requested bandwidth and the available bandwidth;
    means for calculating a transmission rate score for each transmission device based on an average bandwidth required for high definition transmission, wherein the transmission rate score indicates an ability to handle the high definition transmission;
    means for determining a total score based, at least in part, on a summation of the available bandwidth score and the transmission rate score, for each transmission device; and
    means for selecting a transmission device from the set of transmission devices having a highest total.

6. The apparatus of claim 5 further comprising means for calculating a shared access group score for each transmission device, wherein the shared access group score indicates whether or not each transmission device is shared by two or more service groups comprising different subsets of transmission devices, and wherein the total score is based on the summation further comprising the shared access group score.

7. The apparatus of claim 5, further comprising:
    means for determining a service type associated with the content request;
    means for identifying an available service associated with each transmission device; and
    means for calculating a conditional access score for each transmission device based on a comparison of the service type and the available service, wherein the conditional access score indicates whether or not each transmission device is capable of transmitting encrypted transmissions, and wherein the total score is based on the summation further comprising the conditional access score.

8. The apparatus of claim 5, further comprising means for independently weighting the available bandwidth score and the transmission rate score prior to determining the highest total score.

9. A method, comprising:
determining a requested bandwidth associated with a content request received from one or more end users of a content delivery service;
identifying an available bandwidth associated with each of a plurality of transmission devices;
calculating, with one or more processors, an available bandwidth score for each of the plurality of transmission devices, wherein the available bandwidth score comprises a ratio of the requested bandwidth and the available bandwidth;
determining a service type associated with the content request;
identifying an available service associated with each of the plurality of transmission devices;
calculating a service type score for each of the plurality of transmission devices, wherein the service type score comprises a comparison of the service type and the available service;
calculating a total score for each of the plurality of transmission devices based, at least in part, on a summation of the available bandwidth score and the service type score, for each of the plurality of transmission devices; and
selecting a single transmission device having a highest total score from the plurality of transmission devices to handle a transmission of the content to the one or more end users.

10. A computer readable memory device having stored thereon computer readable instructions that, in response to execution by a computing system, cause the computing system to perform operations comprising:
determining a requested bandwidth associated with a content request;
means for identifying an available bandwidth associated with each transmission device of a plurality of transmission devices configured to deliver the content;
calculating an available bandwidth score for each transmission device based on a comparison of the requested bandwidth and the available bandwidth;
calculating a first transmission rate score for each of the plurality of transmission devices based on the available bandwidth and an average bandwidth required for high definition transmission;
calculating a second transmission rate score for each of the plurality of transmission devices based on the available bandwidth and an average bandwidth required for standard definition transmission;
determining a total score based, at least in part, on a summation of the available bandwidth score, the first transmission rate score, and the second transmission rate score, for each of the plurality of transmission devices; and
selecting a transmission device from the plurality of transmission devices with a highest total score.

11. The computer readable memory device of claim 10, wherein the operations further comprise:
determining a service type associated with the content request;
identifying an available service associated with each of the plurality of transmission devices; and
calculating a service type score for each of the plurality of transmission devices, wherein the service type score comprises a comparison of the service type and the available service, and wherein the total score is calculated based on the summation of the available bandwidth score, the first transmission rate score, and the second transmission rate score, in addition to the service type score for each of the plurality of transmission devices.

12. The computer readable memory device of claim 10, wherein the operations further comprise delivering the content in a real time content delivery system.

13. The system of claim 1, wherein the available service indicates that a transmission device is shared among two or more service groups comprising different subsets of transmission devices.

14. The method of claim 9, further comprising:
calculating a first transmission rate score for each of the plurality of transmission devices based on the available bandwidth and an average bandwidth required for high definition transmission; and
calculating a second transmission rate score for each of the plurality of transmission devices based on the available bandwidth and an average bandwidth required for standard definition transmission, wherein the total score for each of said plurality of transmission devices is calculated based, at least in part, on the summation of the available bandwidth score and the service type score in addition to a summation of the first transmission rate score and the second transmission rate score, for each of the plurality of transmission devices.

15. The method of claim 9, wherein the service type indicates whether or not the content is encrypted, and wherein the available service indicates that a transmission device is capable of transmitting encrypted content.

16. The method of claim 9, wherein the available service indicates that a transmission device is shared among two or more service groups comprising different subsets of transmission devices.

17. The method of claim 9, wherein the available bandwidth score and the service type score are independently calculated for each of the plurality of transmission devices.

18. The computer readable memory device of claim 11, wherein the service type indicates whether or not the content is encrypted, and wherein the available service indicates that a transmission device is capable of transmitting encrypted content.

19. The computer readable memory device of claim 11, wherein the available service indicates that a transmission device is shared among two or more service groups comprising different subsets of transmission devices.

20. The computer readable memory device of claim 10, wherein the total score is determined by weighting the available bandwidth score, the first transmission rate score, and the second transmission rate score.

* * * * *

UNITED STATES PATENT AND TRADEMARK OFFICE
CERTIFICATE OF CORRECTION

PATENT NO. : 7,823,179 B2  
APPLICATION NO. : 11/109200  
DATED : October 26, 2010  
INVENTOR(S) : Xiaomei Liu Page 1 of 1

It is certified that error appears in the above-identified patent and that said Letters Patent is hereby corrected as shown below:

On column 8, line 51, CLAIM 5, after "highest" delete "total." and insert -- total score. --.

On column 8, line 52, CLAIM 6, after "claim" delete "5" and insert -- 5, --.

Signed and Sealed this
Twenty-fourth Day of April, 2012

David J. Kappos
*Director of the United States Patent and Trademark Office*